March 8, 1927.
W. R. OYSTON
COLLAPSIBLE BABY CARRIAGE
Filed Nov. 2 1925
1,620,281
2 Sheets-Sheet 1
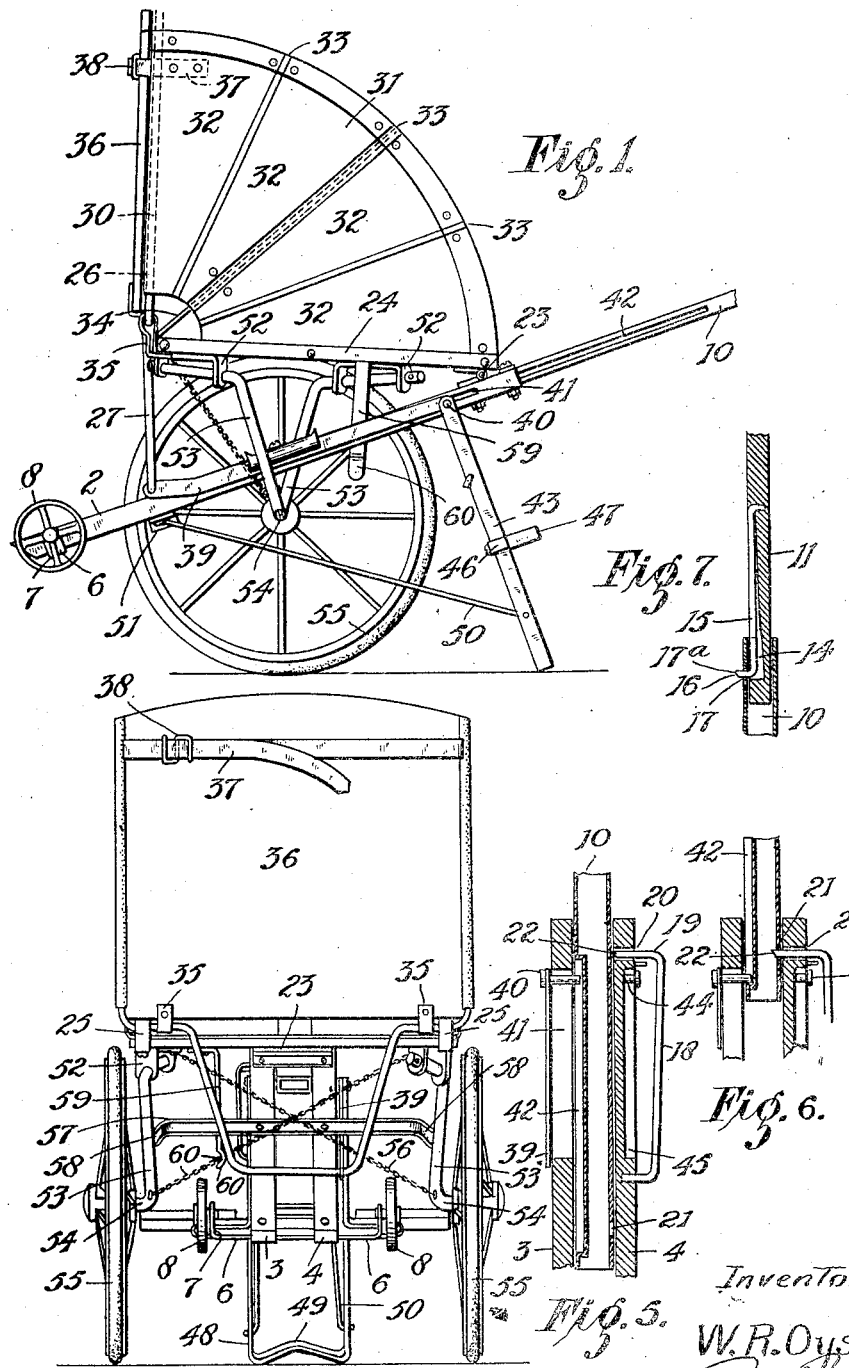

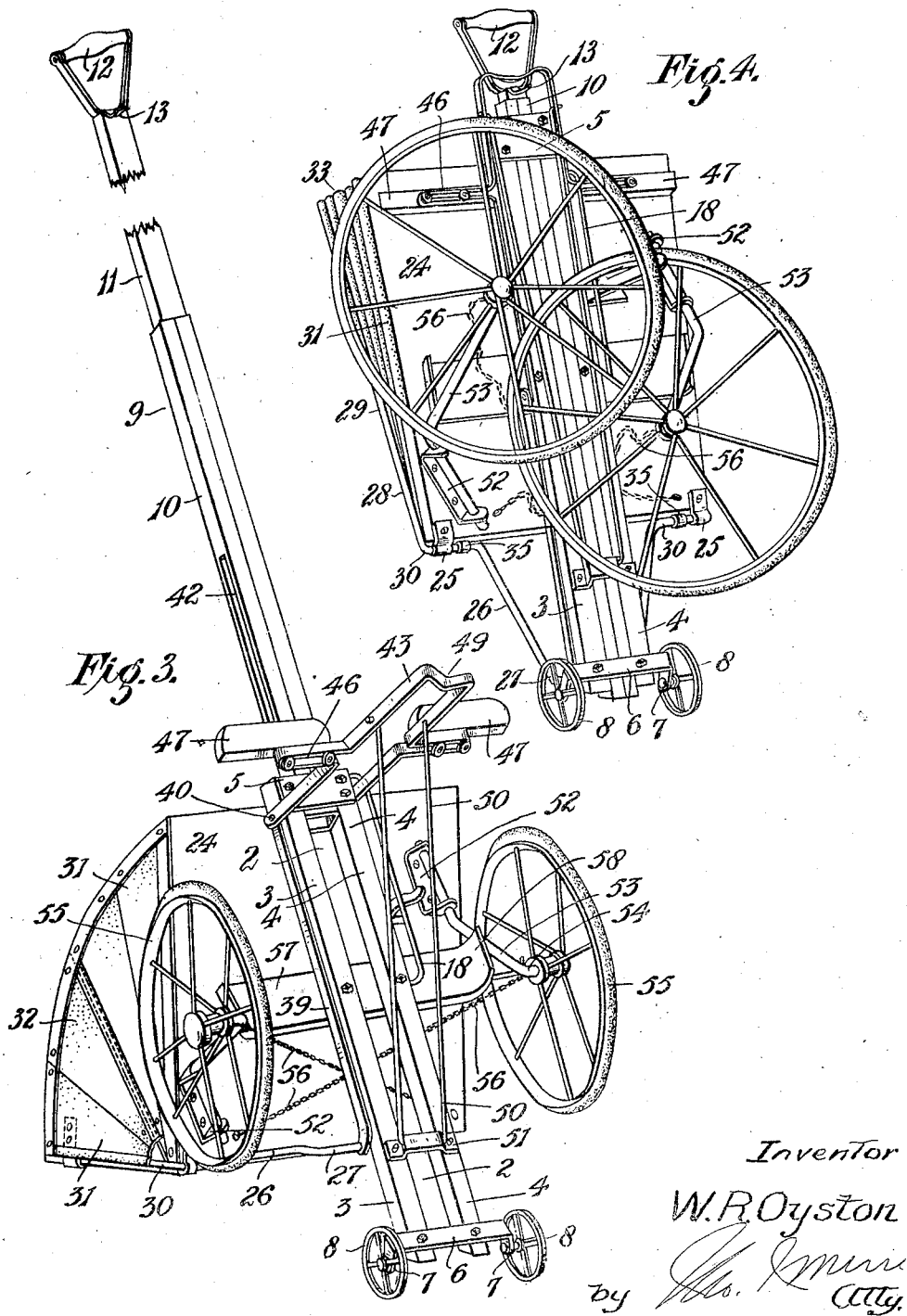

Patented Mar. 8, 1927.

1,620,281

UNITED STATES PATENT OFFICE.

WILLIAM ROBERT OYSTON, OF SYDNEY, NEW SOUTH WALES, AUSTRALIA.

COLLAPSIBLE BABY CARRIAGE.

Application filed November 2, 1925, Serial No. 66,376, and in Australia February 26, 1925.

This invention relates to improvements in collapsible baby-carriages, and its general object is to provide a baby carriage which is light and easily propelled, and when not required for immediate use it can be collapsed into particularly small compass whereby it can be carried or handled with convenience.

The invention is characterized, in particular, by an arrangement whereby the collapse and the extension of the integers of the baby-carriage are effected by movements imparted to a slidable handle.

A baby-carriage according to the invention comprises a guide-frame wherein a handle is slidably mounted. A seat is hingedly connected to said guide-frame and it supports bodywork which is adapted to fold in fan-wise fashion against the upper surface of said seat.

Pivoted to the seat is a lever, which is connected at its upper end to the bodywork and at its lower end to a link secured to an operating member slidable in a slotway in the guide-frame. Connections are provided between the handle and said operating member whereby slidable movement of said handle in the guide-frame operates the link causing the lever to be pivotally moved, thus collapsing the baby-carriage seat against the guide-frame and also folding the bodywork against the upper surface of said seat.

The baby-carriage may have a front support which is pivotally or hingedly connected to the slidable operating member in the guide-frame slotway so that when the seat and the bodywork are being collapsed by movement of the handle within the guide-frame, said support will be upwardly folded and lie flat against the under surface of said guide-frame.

The travelling wheels of the baby-carriage are mounted on cranked arms, which are pivotally connected to the undersurface of the seat, and locked against inward folding movement when the baby-carriage is extended, but when the baby carriage is being collapsed said cranked arms are automatically released and are foldable flatwise against the guide-frame. Locking devices are provided for locking the various integers of the baby-carriage in collapsed and extended position.

A representative form of the invention is illustrated in the accompanying drawings, wherein:—

Figure 1 is a view in side elevation of the improved baby-carriage in extended position.

Figure 2 is a rear end view.

Figure 3 is a perspective view showing the baby-carriage in extended position and arranged on end in the upright position in which it is conveniently collapsed.

Figure 4 is a perspective view showing the baby-carriage when collapsed.

Figures 5 and 6 are sectional detail views illustrating the guide-frame, the slidable handle, and the means for locking the baby-carriage in extended position.

Figure 7 is a sectional detail view of a slidable telescopic handle showing the handle sections locked in extended position.

In these views 2 designates a guide-frame consisting of two parallel and appropriately spaced members 3 and 4 connected at their forward ends by metal plates 5 and at their rear ends by a cross-bar 6. Said cross-bar has upwardly bent ends 7 supporting small curbing wheels 8.

Longitudinally slidable in said guide-frame 2 is a telescopic handle 9, consisting of a tubular section 10 formed of sheet metal and a second section 11 preferably of wood, which is slidable within said tubular section and provided at its outer end with a hand-grip 12 and an angle bracket 13 the purpose of which latter is hereinafter described.

Housed in a longitudinal slot 14 formed centrally in the handle section 11 near to its lower end is a locking spring 15 having an outturned end 16 to spring through a hole 17 formed in the upper end of the tubular handle section 10 and thus hold the two handle sections in extended position as is illustrated in Figure 7. The outer end 16 of the locking spring 15 is bevelled at $17^a$ in order that when the baby-carriage is being collapsed, the handle sections 10 and 11 are released by the contact of said bevelled end with one of the plates 5 of the guide-frame.

Provided on the side member 4 of the guide-frame is a locking spring 18 having an inwardly bent end 19, which passes through a hole 20 formed in said side member and adapted to spring into a hole 21 at the lower end of the tubular handle section 11 to thus lock the handle in rigid extended position when the baby carriage is being propelled. The bent end 19 is bevelled at 22—see Figures 5 and 6—to ensure the locking spring 18 automatically springing into said hole 21 when the handle is extended to the complete extent.

Connected to the forward end of the guide-frame 2 by a hinge 23 is a seat 24 appropriately upholstered or padded on its upper surface to provide a comfortable seat for the baby occupant of the carriage. Pivotally mounted in brackets 25 secured to the rear end of the seat 24 is a lever 26, which is constructed with a central bent portion 27, two upwardly extending arms 28 formed with straight vertical members 29, and intermediate horizontal members 30 receiving the said brackets 25. The vertical members 29 of said lever are secured to a bodywork 31 which is formed of leather or other like flexible material. The said bodywork has a series of rigid panels 32 of segmental shape connected by flexible portions 33 enabling said bodywork to be folded similarly to a fan against the upper surface of the seat 24 when the baby-carriage is being collapsed.

The bodywork 31 has a central strengthening rib 34 of U-shape, which is embraced by the flexible portions 33 and extends across the rear end of seat 24. Hingedly connected to the horizontal members 30 of the lever 26 by strap-hinges 35 is a rear flap 36, which can be adjusted angularly to suit the occupant of the baby carriage by straps 37 connected to the bodywork and adjustably fastened together by a buckle 38.

Attached to the central bent portion 27 of the said lever 26 is a link 39 connected at its forward end to a pin 40, which is slidable in a slotway 41 formed in the side member 3 of the guide-frame 2. This pin 40 has its inner end fitting into a groove 42 provided in the side of the tubular handle section 10, and it is adapted to be slidably moved within the slotway 41 by the engagement therewith of the ends of said groove 42 when the handle 9 is slidably moved in the guide-frame 2.

A stand or front support 43 consisting of a metal bar bent to substantially U-shape is pivotally connected at its upper end to the pin 40 and at its opposite end to a pin 44, which is slidably accommodated in a groove 45 formed in the side member 4 of the guide-frame 2. This stand or support is constructed having laterally bent extensions 46 to which are secured foot-rests 47 for the baby occupant of the carriage. The base portion 48 of said stand is upwardly bent as at 49 so that it can engage with the angle bracket 13 at the outer end of the handle when the baby-carriage is collapsed. Pivoted to the stand or support 43 adjacent to its lower end is a stay 50 also of U-shape, which is similarly connected at its rear end to a bracket 51 secured to the guide-frame 2.

Secured to the undersurface of the seat 24 at opposite corners thereof are brackets 52 wherein cranked arms 53 are rotatably mounted. These arms have stub axles 54 at their free ends, on which travelling wheels 55 of ordinary type are revolvably mounted.

Chains 56 or like flexible connections are anchored at one end to the undersurface of the seat 24 and are connected at their opposite ends to the cranked arms 53. These chains prevent said cranked arms from moving outwardly beyond vertical position and thus prevent spreading of the travelling wheels 55 when the baby-carriage is in use. Secured transversely to the upper surface of the guide-frame is a metal bar or plate 57 having downwardly bent ends 58 adapted to press firmly against the inner surfaces of the cranked arms 53 when same are in extended position and maintain them rigid against inward collapse.

A depending spring-clip 59 is secured to the undersurface of the seat 24, and it has its end 60 of appropriately curved design to automatically spring over and hold the rim of one of the wheels 55 when both of said wheels are collapsed inwardly.

When the baby-carriage is extended as shown particularly in Figures 1 and 2, the handle sections 10 and 11 are locked in extended position by the end 16 of the locking spring 15 being sprung into the hole 17 in the inner of said handle sections. The bodywork 31, the lever 26 and the front stand or support 43 are maintained extended by the end 19 of the locking spring 18 engaging the hole 21 in the tubular handle section. The cranked arms 53 supporting the travelling wheels 55 are rigidly held in their extended vertical position by the ends 58 of the transverse bar or plate 57, and are restrained against movement beyond the vertical by the flexible connections 56.

To collapse the baby-carriage whereby it folds into small compass for carrying or other purposes, the spring 18 is first moved outwardly to disengage its inwardly bent end 19 from the hole 21 in the tubular handle section 10 and thus release the handle. The baby-carriage is then stood on end in an approximately upright position on its curbing wheels 8 and downward pressure is applied to the hand-grip 12 to cause the tubular handle section 10 to slidably move within the guide-frame 2. The downward sliding movement of said handle section causes the upper end of the groove 42 to contact with the pin 40 and slidably move said pin in downward direction within the slotway 41, thus also moving the link 39 downwardly. Said link in turn moves the central bent portion 27 of the lever 26 in the direction towards the curbing wheels 8, causing said lever to pivotally move in the brackets 25 on the seat 24. This movement of said lever 26 pivotally moves the seat 24 inwardly on its hinge 23 and also moves the lever arms 29 inwardly to said seat, thus causing the bodywork 31 to be infolded fan-wise. The further downward slidable movement of said handle section 10 within the guide-frame 2 eventually moves the pin 40 to the end of the slotway 41. The lever 26 is now infolded to the furthest limit and the seat 24 lies flat against the upper surface of the guide-frame 2, while the bodywork 31 and the rear flap 36 are completely infolded and lie flat upon the upper surface of the seat, see Figure 4.

Simultaneously with the collapse of the seat 24 and the bodywork 31, the front support or stand 43 is infolded and rests flatwise against the undersurface of the guide-frame 2. This collapsing action is also performed by the pin 40 which, whilst being slidably moved along the slotway 41 by the handle section 10, moves the upper end of said support or stand in the direction towards the curbing wheels 8, thus bringing the lower end 48 of said support or stand to lie against the lower plate 5 and the foot-rests 47 into the spaces on opposite sides of the guide-frame 2, while the stay 50 folds beneath said support or stand.

During the collapse of the seat 24 against the upper surface of the guide-frame 2, the cranked arms 53 move inwardly with said seat, with the result that when said seat is fully collapsed said cranked arms are disengaged from the down-turned ends 58 of the transverse plate 57. Said cranked arms together with the travelling wheels 55 are then conveniently foldable inwardly one against the other.

When the handle section 10 has been moved downwardly to the fullest extent, the bevelled member 17ᵃ of the spring 15 is brought into engagement with the upper of the plates 5, and further pressure exerted on said handle then causes the end 16 of said spring to be released from the hole 17 and permits the handle section 11 to be telescopically slid into the tubular handle section 10. The angle bracket 13 carried by the outer handle section is then inserted beneath the bent portion 49 of the front support or stand 43 to thus hold the handle collapsed and permit the collapsed baby-carriage to be conveniently carried by the hand-grip 12. The rim of the outer travelling wheel 55 is then engaged by the spring clip 59 to rigidly hold the wheels in infolded position.

To extend the baby-carriage, the outer travelling wheel 55 is first disengaged from the spring-clip 59, and both of said travelling wheels with their cranked supporting arms are swung outwardly to the limit permitted by the chains or like flexible connections 56. The bent end 49 of the front support or stand 43 is then moved outwardly to release it from the angle bracket 13, when an upward pulling action is exerted on the hand-grip 12 such as will cause the outer handle section 11 to telescopically slide from the tubular section 10 until such time as the end of the locking spring 15 automatically engages with the hole 16, which engagement prevents further telescopic movements of the outer handle section.

Continued pulling action exerted on the hand-grip 12 now causes the inner handle section 10 to slide outwardly to the guide-frame 2, when the lower end of the groove 42 in the handle section 10 engages the pin 40 and moves said pin along the slotway 41 in the direction towards the front of the baby-carriage. The movement of the pin 40 is transmitted by the link 39 to the central bent portion 27 of the lever 26, causing said lever to pivotally move in the brackets 25 and impart outward and upward movement to the rear portion of the seat 24 and simultaneously cause the lever arms 29 to swing outwardly and unfold the bodywork 31 until fully extended. As the seat 24 is moved, the cranked arms 53 carrying the travelling wheels 55 are also actuated so that they are brought into engagement with the downwardly bent ends 58 of the transverse bar or plate 57 which frictionally engage said cranked arms and hold them rigidly with said wheels at right angles to said seat.

Simultaneously with the pivotal movement of the seat and the extension of the folded bodywork 31, the front support or stand 43 is swung outwardly by having its upper end moved forwardly by the pin 40.

When the members of the baby-carriage are extended and the handle section 10 is withdrawn to the fullest extent from the guide-frame 2, the inturned end 19 of the locking spring 18 engages with the hole 21 and locks each and all of the foldable integers of the baby-carriage in extended position.

A baby-carriage constructed according to the invention is exceptionally light and durable in construction and when collapsed for carrying, storage or other purposes it occupies but little space and will thus be found particularly convenient in use.

What I do claim is:—

1. A collapsible baby-carriage comprising a seat, body-work collapsible against said seat, travelling wheels, a guide-frame, a hinge connection between said seat and said guide-frame, cranked arms carrying said travelling wheels pivoted to said seat, a lever pivoted to said seat and connected to said body-work, a slotway in said guide-frame, a slide member accommodated in said slotway and connected to said lever, and a handle slidable in said guide frame and adapted when slid therein to engage said slide member and actuate said lever to infold said seat and body-work and release the travelling wheels for infolding, and when withdrawn from said guide-frame to engage said slide member to extend said foldable integers.

2. A collapsible baby-carriage according to claim 1, wherein a transverse member is fitted to the guide-frame and operatively engages the cranked arms when outfolded to maintain the wheels in travelling position and flexible connections limit the outward movement of the travelling wheels carried by said cranked arms.

3. A collapsible baby-carriage according to claim 1, wherein link connections are provided between the slide member and the lever, and a front support carrying foot-rests is pivoted to said slide member.

4. A collapsible baby-carriage according to claim 1, wherein a spring clip is secured to the seat and engages the rim of one of the travelling wheels when said wheels are infolded.

5. A collapsible baby carriage comprising a frame, a seat pivotally connected thereto, a body movably mounted on the seat, a handle slidable in the frame, lever connections intermediate the said seat and body, and means on the frame adapted to be operated by the sliding movement of the handle to collapse the body on the seat and lower the seat on the frame.

6. A collapsible baby carriage comprising a frame, a seat pivotally connected thereto, a body movably mounted on the seat, a handle slidable in the frame, lever connections intermediate said seat and body, and means on the frame adapted to be operated by the sliding movement of the handle to collapse the body on the seat and lower the seat on the frame, wheels supported by the seat and adapted to be moved from an inoperative position against the frame to an operative position relative to the seat, and means carried by the frame to hold the wheels in operative position when the seat is raised out of contact with the frame.

7. A collapsible baby carriage comprising a frame, a seat pivotally connected thereto, a body movably mounted on the seat, a handle slidable in the frame, lever connections intermediate said seat and body, and means on the frame adapted to be operated by the sliding movement of the handle to collapse the body on the seat and lower the seat on the frame, and a stand for the carriage pivotally supported on the frame, said means operating during the collapse of the body and movement of the seat to fold the stand substantially into the plane of the frame.

8. A collapsible baby carriage comprising a frame, a seat pivotally connected thereto, a body movably mounted on the seat, a handle slidable in the frame, lever connections intermediate said seat and body, means on the frame adapted to be operated by the sliding movement of the handle to collapse the body on the seat and lower the seat on the frame, a stand for the carriage pivotally supported on the frame, said means operating during the collapse of the body and movement of the seat to fold the stand substantially into the plane of the frame, and means on the sliding handle and stand to interlock when the parts are folded to permit the collapsed carriage to be handled as a unit.

In testimony whereof I affix my signature.

WILLIAM ROBERT OYSTON.